Aug. 19, 1924.
F. L. HOLT
1,505,197
DRIVER BOX
Filed Nov. 15, 1920
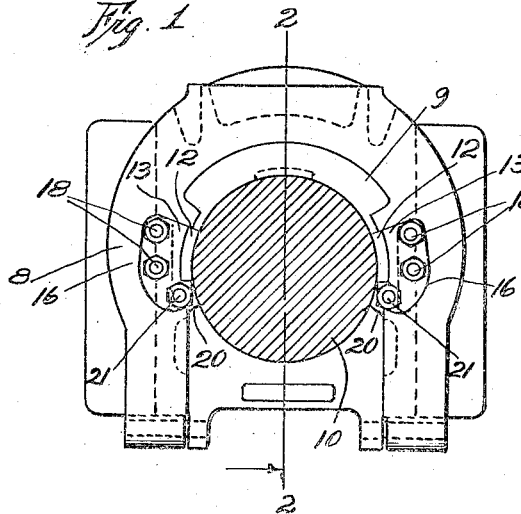
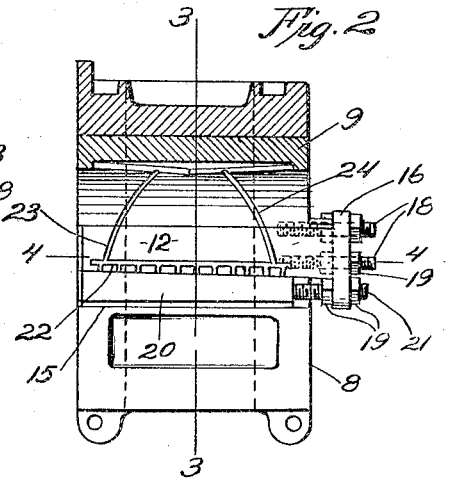
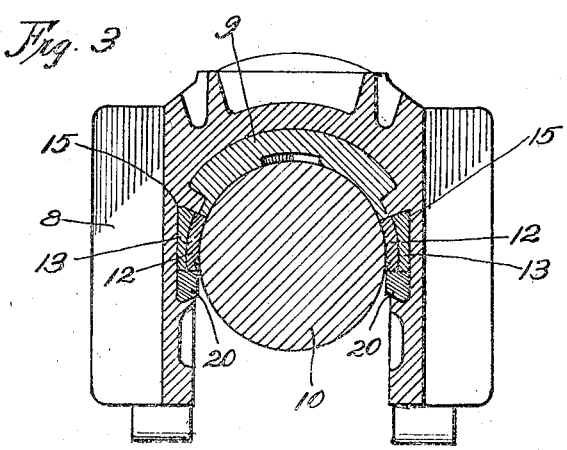
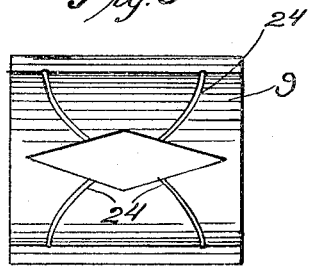
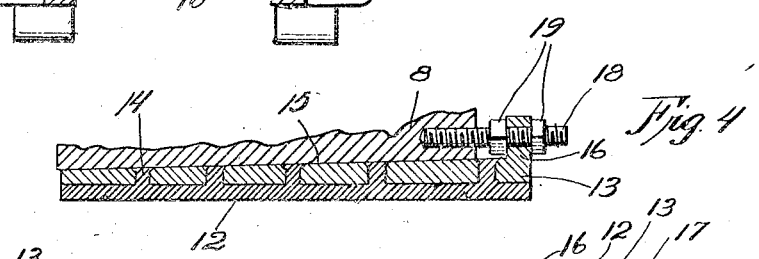
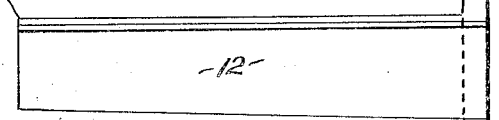
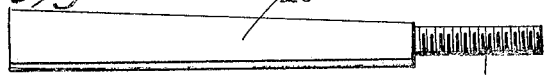
Inventor
F. L. Holt
By Thorpe & Gerard
Attorneys
Witness:
R. L. Hamilton Patented Aug. 19, 1924.

1,505,197

UNITED STATES PATENT OFFICE.

FRANK L. HOLT, OF VAN BUREN, ARKANSAS.

DRIVER BOX.

Application filed November 15, 1920. Serial No. 424,073.

*To all whom it may concern:*

Be it known that I, FRANK L. HOLT, citizen of the United States, and resident of Van Buren, county of Crawford, State of Arkansas, have invented a certain new and useful Improvement in Driver Boxes, of which the following is a complete specification.

The present invention relates to bearing boxes, and aims to provide an improved bearing box structure particularly adapted for the driving boxes of locomotive engines, and one of the principal objects in view is to make special provision for adjusting or taking up the wear in the bearings which is caused by the thrust and rocking of the journals within the bearings, such as commonly characterizes the bearing structures of heavy locomotives.

Accordingly I have devised a bearing construction particularly adapted for locomotive driving boxes, and in which the box is bushed with a crown brass of the usual type but of smaller extent, in addition to which a bushing is provided for lining each of the sides of the bearing, and equipped with means for suitably adjusting each of said side bushings as often as may be required for taking up the wear thereon.

As a practical embodiment of this improved feature of the construction, I preferably associate with each of the adjustable bushings a tapered key or wedge member having means for longitudinally adjusting the same for producing the required adjustment of the corresponding bushing; and as a further feature of the improvement, each key member is provided with a second co-operating key element adapted for securely locking the parts, including the bushing, in their selected positions of adjustment.

With the foregoing general object in view, the invention will now be described in detail by reference to the accompanying drawing illustrating one practical form of construction for embodying the invention, after which the novel features therein will be particularly set forth and claimed.

In the drawing:—

Figure 1 is an end elevation illustrating a driving box constructed in accordance with the present invention, and showing the corresponding journal in section;

Figure 2 is a vertical sectional view, taken on the line II—II of Figure 1;

Figure 3 is a transverse section taken on the line III—III of Figure 2;

Figure 4 is a longitudinal section, taken on the line IV—IV of Figure 2 (part of the bearing box being broken away);

Figure 5 is an inverted plan view of the crown brass or bushing;

Figure 6 is a detail view showing one of the side or thrust bearings in side and end elevation, respectively; and Figure 7 is a side view of one of the key members used for locking the adjustable bushings.

It is well known that all heavy locomotive engines develop a pounding trouble in their main bearings or driving boxes, which is caused by the fact that the axles which are journaled in these boxes are connected with drivers actuated by separate motive units operating through crank pins that are set one quarter apart; that is, the driving impulses are imparted at different intervals to said drivers, and consequently to the corresponding journals within the bearing boxes. On account of this, the bearing surfaces within the boxes are alternately subjected to thrusts and rocking movements of the journals therein, which results in telling wear upon the bushings and particularly upon the bushed surfaces at the sides of the bearings, the unevenly worn condition within the box finally showing up in the kicks and pounds which become very marked as the engine units pass their centers. In the case of main driving boxes, the brasses used for lining the bearings have been customarily of semi-circular form, the weight upon the bearings being depended upon to hold them upon the journals, and the thrust and rocking pressure above referred to comes principally upon the sides of the brasses near the extremities thereof; as these have become worn, there has been no way of closing up the gaps between the journals and the bushings, so that the only repair possible was to drop the wheels and axle from the boxes for the purpose of removing the brasses and replacing them with others which would fit the journals. Shop work of this character is of course expensive, entirely aside from the damage done to the locomotive due to the tear and strain upon its driving mechanism and any means or method whereby these serious objections to the present box or bearing construction may be avoided would be very desirable and worthy of adoption. The improvements which I have in view involve no departure from the present style of driving box, but merely a change in the bearing construction which will enable separate thrust bearings or bushings to be employed extending below the center of journal, with provision for the necessary adjustment or renewal of these thrust bearings from time to time.

Referring now to the drawing in detail, this illustrates a driving box 8 of ordinary form, and having the crown portion of the bearing bushed by means of a crown brass 9 adapted to support the box upon the journal 10 of the axle, but stopping short of the sides of the journal to enable separate thrust bearings to be mounted opposite the sides of the journal, as is clearly illustrated in Figure 3 of the drawing. Each of these thrust bearings comprises a bushing element 12 carried by a key member 13 and secured thereto in any desired manner, as by being interlocked therewith by means of the lugs or extensions 14 formed in the pouring of the bearing element during the assembly of the same in connection with the key 13. This key member 13 is of longitudinally tapered form, as shown in Figure 4, and also of slightly transversely tapered outline, as shown in Figure 3, for adapting it to be mounted in the undercut and longitudinally tapered channel or keyway 15, there being such a channel or keyway at each of the opposite sides of the bearing box. The outer end of each key member is formed with a lateral plate extension 16 having a series of openings 17, two of which openings 17 are used for accommodating a pair of screws 18 and the inner ends of which are fitted into the face of the adjacent end of the bearing box 8, locking nuts 19 being provided on each screw 18 for firmly securing the key member 13 in any set position.

Associated with each of the key members 13 is a cooperating locking key element 20 which is also of longitudinally tapered form, conforming in general to the outline of the key member 13 and adapted to be accommodated within the lower portion of one of the undercut channels or keyways 15, for the purpose of locking its companion key member 13 and the bushing carried thereby in any position to which the same may be adjusted. The outer end of each key element 20 is formed with a screw extension 21 adapted to be projected through one of the openings 17 of the extension 16 from the key member 13, and also carrying locking nuts 19, whereby the key element 20 may be securely held in any position of adjustment.

Preferably each of the bushing elements 12 is formed with a longitudinal channel 22 on its bearing face, the opposite ends of the channel 22 having upwardly extending branch channels 23 adapted to be brought in register with corresponding channels 24 provided on the inner face of the crown brass 9, all for the purpose of facilitating a flow of lubricant across the bearing faces of both said crown and thrust bearing brasses, as will be readily understood.

The function of the above described construction will be clear from an inspection of the drawing, it being apparent that in the event of the side bearing bushings 12 becoming unduly worn and requiring adjustment, such adjustment may be effected by the necessary longitudinal shifting of the corresponding key member 13 and bushings 12 associated therewith. This operation is carried out by first loosening the outer nut 19 upon the key extension 21, in order to permit the corresponding key member 13 to be shifted longitudinally inward, which adjustment of the key member 13 is then effected, by loosening the inner nuts 19 on the screws 18 and then tightening the outer nuts 19, whereby the key member 13 and its bushing element 12 are forced inward along the channel 15. All the inner nuts 19 are then tightened, as well as the outer nut 19 of the key member 20, for securely locking the parts as adjusted. Obviously such adjustment of the thrust bearing operates to close any gap which may have been produced between the journal and its bearing by the wearing down of the latter. Such an adjustment may be accomplished in a very short time as compared to the amount of time and labor which would be required in the dropping of the driver wheels and their axle from the boxes, and this operation of adjustment of the bearings can be attended to at any time and within a few minutes after any signs of pounding trouble have become noticeable; consequently, trouble of this character from worn bearings is remedied at the very start, and not allowed to work further and cause serious damage to the engine mechanism by inattention until the locomotive can be run into the shop, which is only done periodically and at comparatively long intervals. Furthermore, by this prompt taking up of the wear, the shopping of the locomotive is rendered less frequent, thereby materially reducing the expense of the time and labor required in the upkeep of the same so far as its bearing construction is concerned, as well as the damage resulting from worn or defective bearings.

What I claim is:

1. A bearing box structure having a bushing for lining the crown portion of the bearing, an adjustable tapered bushing member serving as a lining for one of the sides of said bearing, and adjusting means operative to shift said adjustable bushing member lengthwise or longitudinally of the bearing to take up the wear thereon.

2. A bearing box structure having a bushing for lining the crown portion of the bearing, an adjustable tapered bushing member serving as a lining for one of the sides of said bearing, and adjusting means operative to shift said adjustable bushing member lengthwise or longitudinally of the bearing to take up the wear thereon.

3. A bearing box structure having a bushing for lining the crown portion of the bearing, a pair of adjustable tapered bushing members serving as linings for the opposite sides of said bearing, and separate adjusting means operative separately to shift said adjustable bushing members lengthwise or longitudinally of the bearing to take up the wear thereon.

4. A bearing box structure having an adjustable tapered bushing member serving as a lining for one of the sides of said bearing, an oppositely tapered key member in longitudinal engagement with said bushing member, and means for relatively longitudinally adjusting said members to take up the wear on said bushing member.

5. A bearing box structure having an adjustable bushing member serving as a lining for one of the sides of said bearing, an oppositely tapered key member in longitudinal engagement with said bushing member, and screw and nut devices operatively arranged between one end of said box and the adjacent ends of said members for relatively longitudinally adjusting the same to take up the wear on said bushing member.

6. A bearing box structure provided with an interior undercut and longitudinally tapered keyway, an adjustable tapered bushing member longitudinally slidable in said keyway, and means for longitudinally shifting said bushing member in said keyway to take up the wear thereon.

7. A bearing box structure provided with an interior undercut and longitudinally tapered keyway, an adjustable tapered bushing member longitudinally slidable in said keyway, an oppositely tapered key member also slidable in said keyway in longitudinal engagement with said bushing member, and means for longitudinally adjusting said members in said keyway for longitudinally shifting said bushing to take up the wear thereon and lock the same in adjusted position.

8. A bearing box structure having a bushing for lining the crown portion of the bearing, a pair of tapered bushings serving as linings for the sides of said bearing, interior longitudinally extending ledges supporting said crown bushing independently of said side bushings, and separate means for longitudinally shifting each of said side bushings lengthwise of the bearing box to take up for wear.

In witness whereof, I hereunto affix my signature.

FRANK L. HOLT.